United States Patent
Stewart

(10) Patent No.: US 6,789,153 B1
(45) Date of Patent: Sep. 7, 2004

(54) BRIDGE FOR COUPLING DIGITAL SIGNAL PROCESSOR TO ON-CHIP BUS AS SLAVE

(75) Inventor: Charles H. Stewart, Richardson, TX (US)

(73) Assignee: LSI Logic Corporation, Milpitas, CA (US)

( * ) Notice: Subject to any disclaimer, the term of this patent is extended or adjusted under 35 U.S.C. 154(b) by 480 days.

(21) Appl. No.: 09/847,850

(22) Filed: Apr. 30, 2001

Related U.S. Application Data

(60) Provisional application No. 60/270,063, filed on Feb. 20, 2001.

(51) Int. Cl.[7] .............................................. G06F 13/00
(52) U.S. Cl. ......................... 710/306; 710/65; 710/311; 710/315
(58) Field of Search ........................... 710/65, 306–315

(56) References Cited

U.S. PATENT DOCUMENTS

| | | | |
|---|---|---|---|
| 6,128,673 A | 10/2000 | Aronson et al. | |
| 6,247,082 B1 * | 6/2001 | Lo et al. | 710/105 |
| 6,467,010 B1 * | 10/2002 | Pontius et al. | 710/305 |
| 6,529,847 B2 | 3/2003 | Hamilton et al. | |
| 6,567,881 B1 * | 5/2003 | Mojaver et al. | 710/313 |
| 6,571,308 B1 | 5/2003 | Reiss et al. | |
| 6,604,163 B1 * | 8/2003 | Duboc | 710/306 |
| 6,654,844 B1 * | 11/2003 | Piirainen et al. | 710/305 |
| 2001/0016885 A1 * | 8/2001 | Happonen | 710/52 |

* cited by examiner

Primary Examiner—Glenn A. Auve
Assistant Examiner—Nimesh Patel
(74) Attorney, Agent, or Firm—Conley, Rose P.C.

(57) ABSTRACT

A bridge for connecting a DSP to an ASIC on-chip bus as a slave. The bridge couples signals between a DSP internal memory direct memory interface and an on-chip bus such as the AMBA AHB. The bridge includes a generic slave module which provides direct connections to the on-chip bus in the on-chip bus protocol. It also includes a slave engine connected to the DSP memory interface to control read and write transactions with the memory. The generic slave and the slave engine are coupled by a pulse grower and pulse shaver to allow the engine to operate at DSP clock frequency while the generic slave operates at the usually slower on-chip bus frequency. The bridge allows masters in the ASIC to perform read and write transactions with the DSP internal memory.

27 Claims, 7 Drawing Sheets

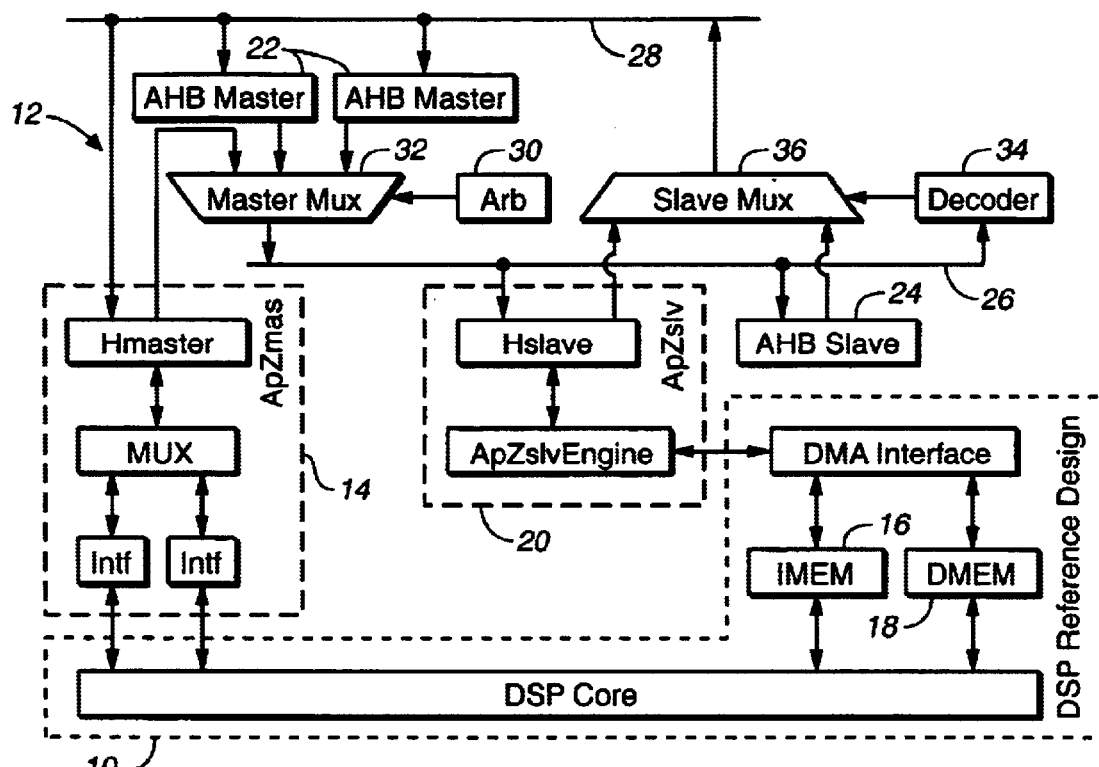
FIG._1
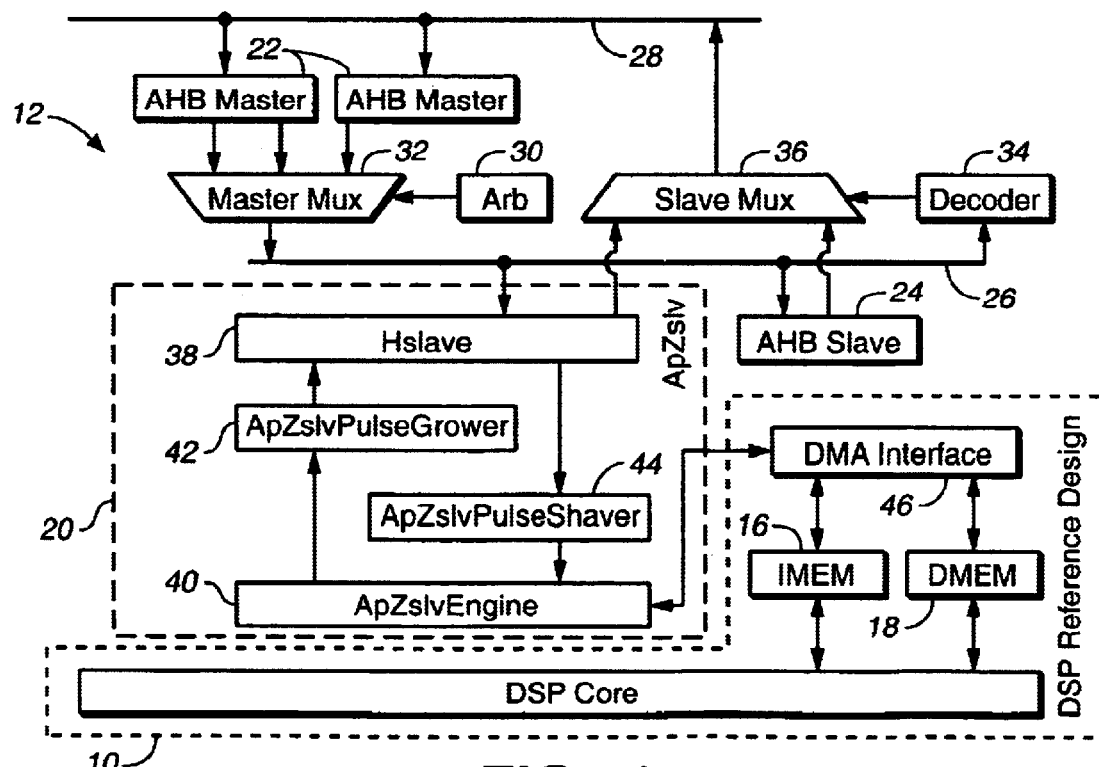
FIG._2

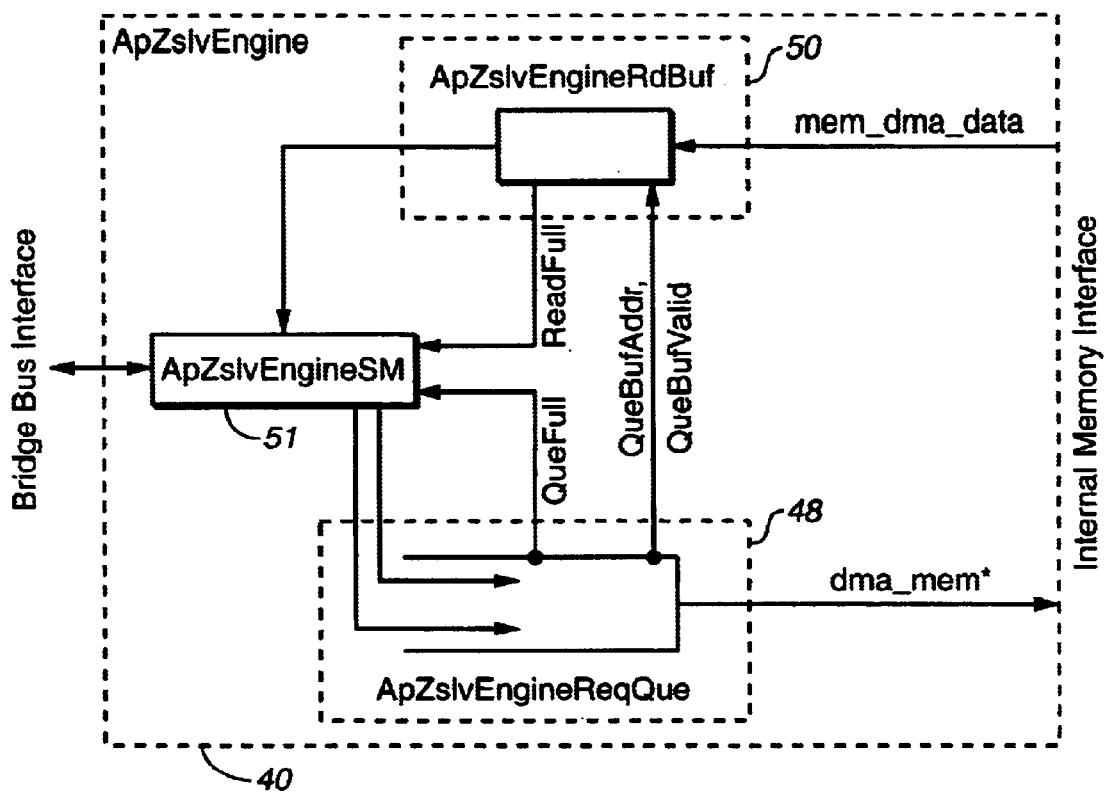
FIG._3

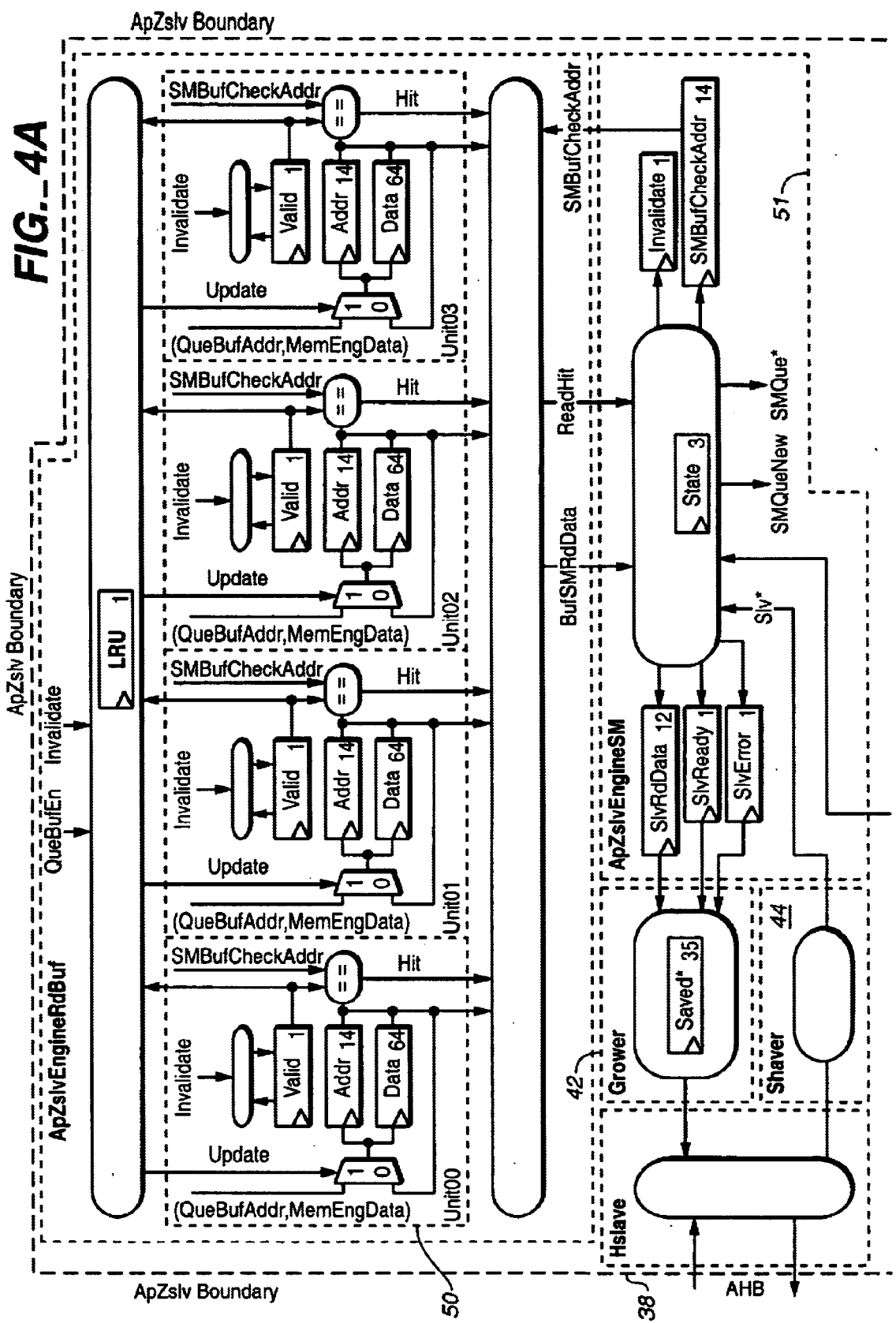
FIG._4A

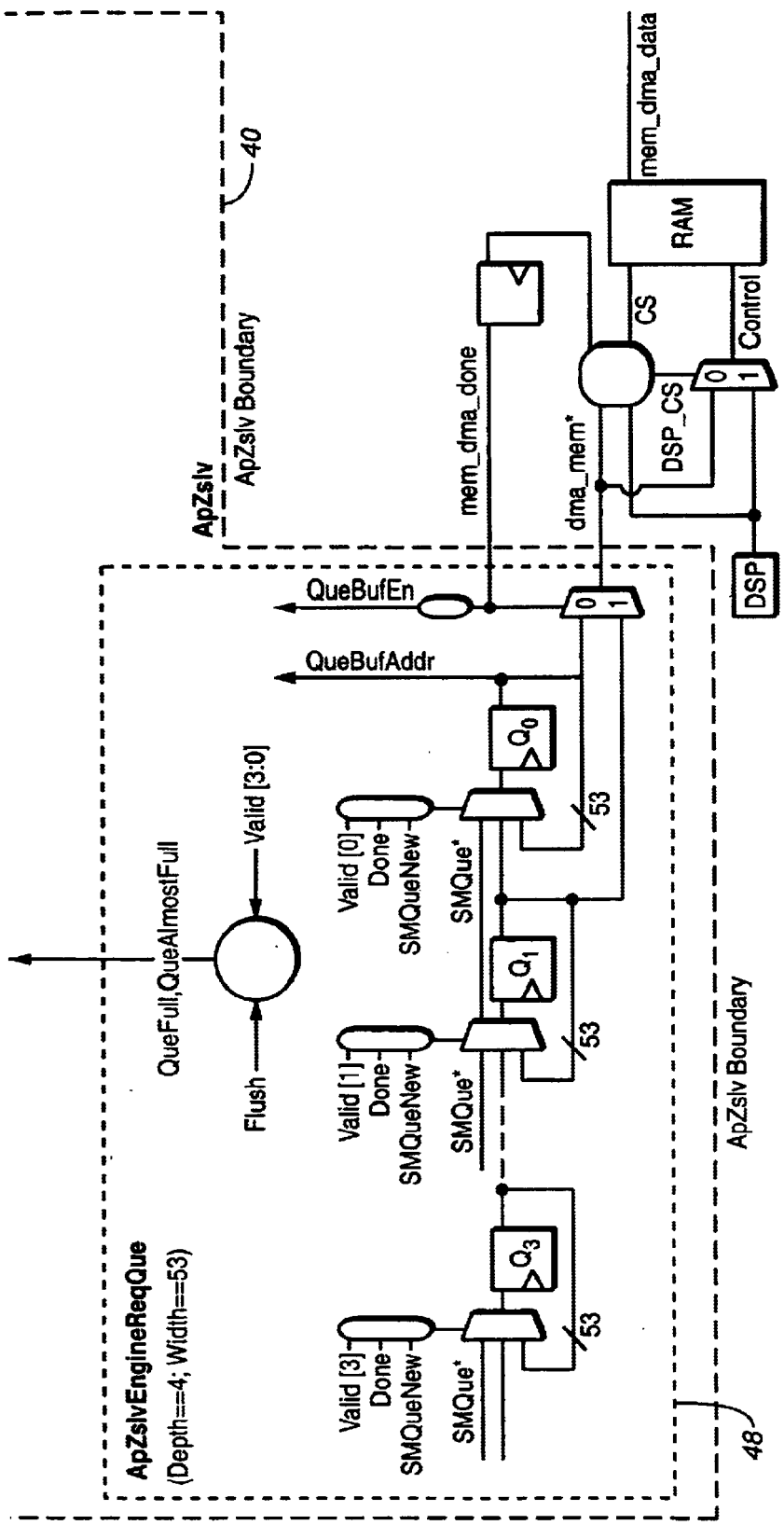
*FIG._4B*
*FIG._4*
| FIG._4A |
|---|
| FIG._4B |

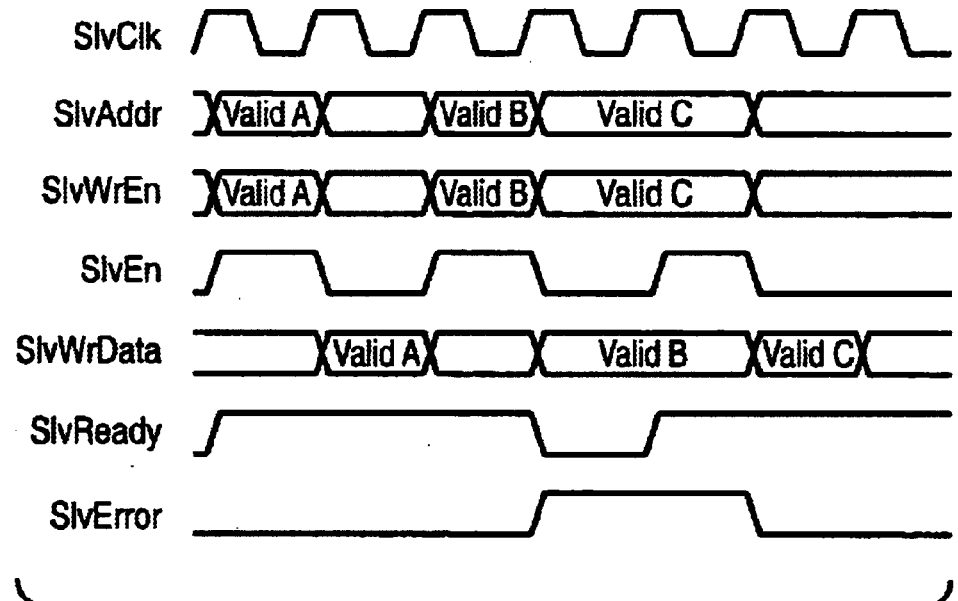
FIG._5
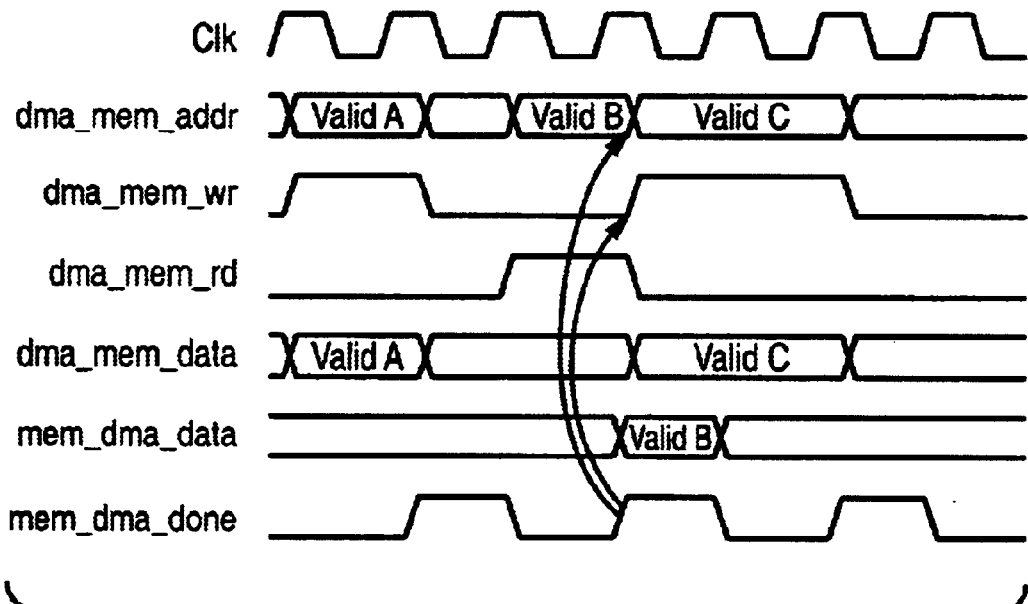
FIG._6

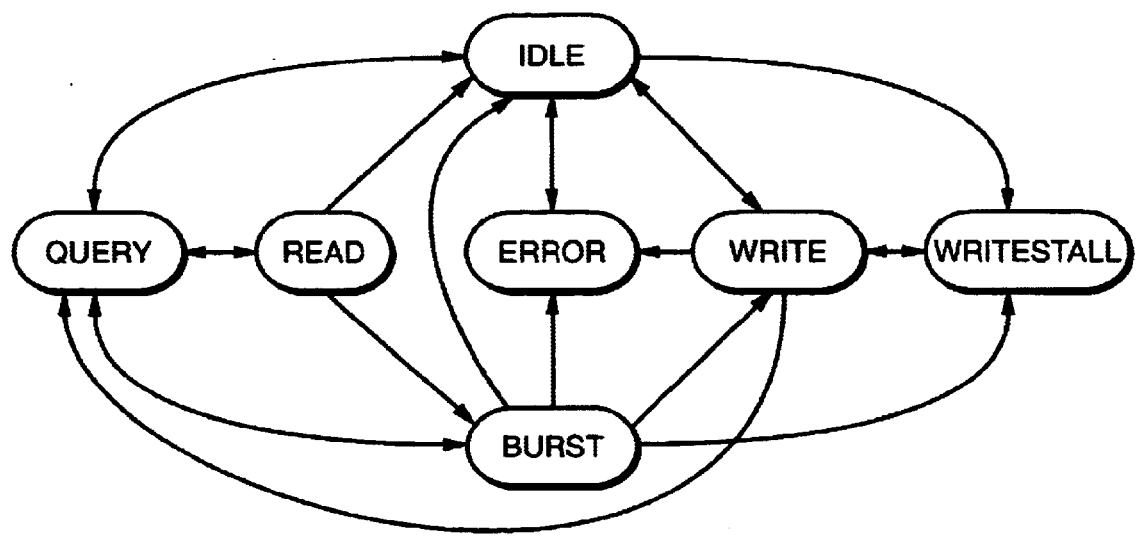
FIG._7
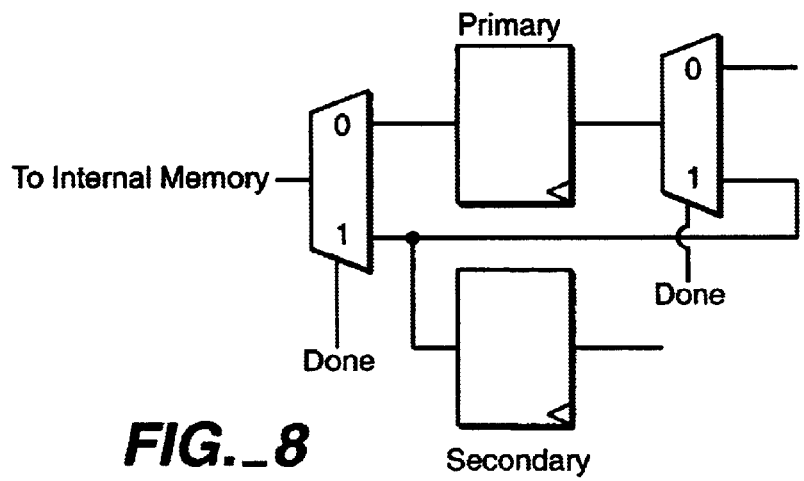
FIG._8
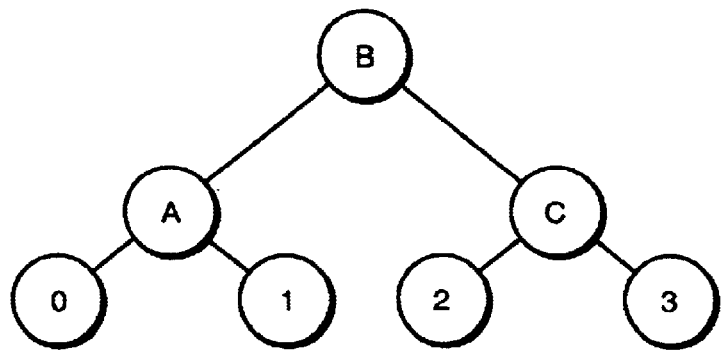
FIG._9

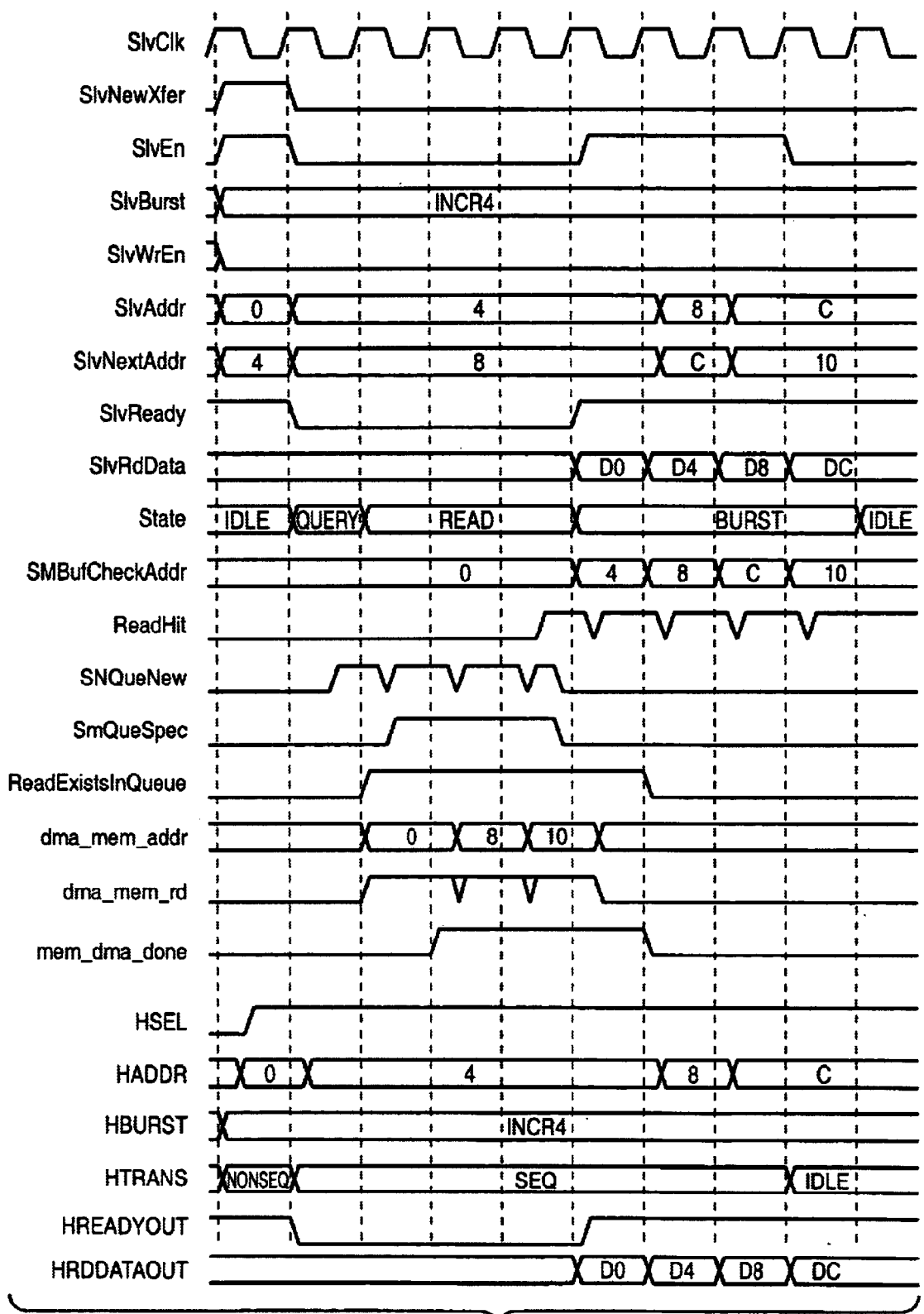
FIG._10

BRIDGE FOR COUPLING DIGITAL SIGNAL PROCESSOR TO ON-CHIP BUS AS SLAVE

CROSS-REFERENCE TO RELATED APPLICATIONS

This application claims priority based on provisional patent application Serial No. 60/270,063, filed Feb. 20, 2001.

This application incorporates by reference for all purposes, the following applications, filed on the same date as this application and assigned to the same assignee as the present application:

U.S. patent application Ser. No. 09/847,850, filed Apr. 30, 2001, now U.S. Pat. No. 6,687,773, issued Feb. 3, 2004, entitled "Bridge For Coupling Digital Signal Processor to AMBA Bus as Master" by inventors Charles H. Stewart and Keith D. Dang; and U.S. patent application Ser. No. 09/847,848, filed Apr. 30, 2001, entitled "A Parameterizable Queued Memory Access System" by inventor Charles H. Stewart.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to digital signal processors (DSPs) and more particularly to a bridge for connecting a digital signal processor (DSP) to an on-chip bus (OCB) such as an Advanced Microcontroller Bus Architecture ("AMBA") Advanced High-performance Bus ("AHB") as a slave.

The device known as the Digital Signal Processor, DSP, is a specialized microprocessor which can process signal streams with complex mathematical formulas in real time. A DSP is typically ten to fifty times more powerful than typical microprocessor devices such as the microprocessor cores used in application specific integrated circuits (ASICs). Applicant's ZSP DSP has an open architecture which allows it to be easily programmed and used for numerous applications.

As complex cores, such as DSPs, are integrated in current and future generation ASICs, leading semiconductor companies are increasingly adopting standardized integration over On-Chip Busses (OCBs). OCB standardization facilitates a host of system on chip issues, including core portability, design reuse, leveraging common peripherals and processors, improving automated verification, and increasing customer capabilities to create products from a common design platform. Many widely used RISC (reduced instruction set computer) and DSP cores have their own complex and unique bus structures that often lack native provisions for straightforward integration with each other and supporting logic. A key need for multi-core systems is for buses to connect together these building blocks in a consistent manner that allows multiple cores to master the bus, rapidly moving large blocks of data and high-speed data transfer. These requirements drive the adoption of OCB standards.

Some additional business drivers for the adoption of OCB standards by semiconductor companies are: facilitating use of high value proprietary cores; reducing barriers to integrating proprietary cores from third party industry sources; providing a freely licensed and non-proprietary system framework and bus structure; reducing risk and engineering effort in system or ASIC integration and communication; minimizing interconnection issues to system companies; and, meeting industry standards for semiconductor vendor independence.

In order to support technical and business OCB requirements, a range of semiconductor companies are adopting the Advanced Microcontroller Bus Architecture (AMBA) for high performance proprietary core integration. AMBA was developed by ARM Inc. in collaboration with its semiconductor partners and put in the public domain to provide a de facto standard for integrating RISC processors to other proprietary cores and peripherals. The Open AMBA standard for a set of system busses for integrating processor and other proprietary cores defines the most widely implemented on-chip bus (OCB) in the industry. The AMBA standard version 2.0 defines three sets of busses, AHB (AMBA High-performance Bus), ASB (AMBA System Bus), and APB (AMBA Peripheral Bus). AHB was developed for on-chip bussing in high bandwidth processor cores.

The AMBA AHB is intended to address the requirements of high-performance synthesizable designs. It is a high-performance system bus that supports multiple bussed cores and provides high-bandwidth operation. The AHB is a single-edge timed, multiplexed data bus controlled by arbitration logic. AHB bus arbitration connects multiple processor and peripheral cores. AHB control signals define arbitration and decoding control of the bus and its interfaces. The AHB controls are not specific to a processor, but are optimized for memory systems. AHB supports block transfers and wider bus controls needed in high-speed high bandwidth systems.

As the applications have become more complex, e.g. multimedia wireless and broadband applications, DSPs have been increasingly used with ASICs to provide the required functionality. However, DSPs generally operate at clock frequencies higher than can be supported by the AMBA AHB and generally use different signal protocols. To realize the benefits of both ASICs and DSP, it would be useful to provide a means for coupling signals, including data and instructions, between the ASIC's on-chip bus, such as the AMBA AHB, and a DSP despite the differing clock frequencies and signal protocols.

A DSP has internal memories to which it is tightly coupled to allow fast transfers of instructions and data between these memories and the DSP core. When a DSP is used with an ASIC, it may be desirable for masters in the ASIC to have access to the DSP internal memories. For example, a master in the ASIC could load the DSP memories before the DSP comes out of reset. An external, AHB based, DMA (direct memory access) controller may need direct access to the internal memories so that it can transfer data.

BRIEF SUMMARY OF THE INVENTION

In accordance with the present invention, a bridge is provided between a direct memory access interface of a DSP and an ASIC on-chip bus which allows the DSP memory to operate as a slave on the on-chip bus. The bridge includes a slave engine which receives read and write requests from the on-chip bus and controls transactions with the DSP internal memories. The engine includes a request queue for storing and managing the read and write requests. It also includes a data buffer for temporary storage of data in read operations.

A generic slave couples signals from the engine to the on-chip bus, providing compliance with the on-chip bus protocol. A pulse grower is used to couple signals from the engine to the generic slave and a pulse shaver is used to couple signals from the generic slave to the engine. The grower and shaver correct for the normally faster clock frequency of the DSP and engine as compared to the on-chip bus.

BRIEF DESCRIPTION OF THE DRAWINGS

FIG. 1 is a general block diagram of a portion of an application specific integrated circuit, a DSP, a bridge connecting the DSP to the application specific integrated circuit as a master, and a bridge connecting the DSP to the application specific integrated circuit as a slave;

FIG. 2 is a block diagram of a portion of an application specific integrated circuit, a DSP, and a more detailed diagram of the bridge connecting the DSP to the application specific integrated circuit as a slave.

FIG. 3 is a more detailed block diagram of the slave engine showing its request queue and read data buffer;

FIG. 4 is a detailed block diagram of a slave bridge according to the present invention;

FIG. 5 is a timing diagram illustrating basic write transactions on the generic bus used in the bridge;

FIG. 6 is a timing diagram illustrating internal memory interface protocol;

FIG. 7 is a flow chart illustrating the functions of the state machine of the bridge;

FIGS. 8 and 9 are an illustration of the control logic for the first two parts of the access request queue and an illustration of the least recently used algorithm used in the read buffer, respectively; and, FIG. 10 is a timing diagram illustrating a burst read transaction.

DETAILED DESCRIPTION OF THE INVENTION

With reference to FIG. 1, an example of a DSP 10 coupled to an ASIC on-chip bus 12. In this embodiment the on-chip bus 12 is an AMBA AHB. The DSP 10 has external instruction and data ports which are coupled by a master bridge 14 to the AHB 12. The master bridge 14 allows the DSP 10 to act as a master on the AHB 12. Master bridge 14 is the subject of the above-referenced and incorporated United States patent application entitled "Bridge For Coupling Digital Signal Processor to AMBA Bus as Master." The DSP 10 also has internal instruction memory (IMEM) 16 and data memory (DMEM) 18 which are coupled by a slave bridge 20 to the AHB 12 as a slave.

The term "on-chip bus" as used herein means any type of bus used in an ASIC, such as the AMBA AHB. The term also includes busses which physically extend beyond a single chip, for example onto a printed circuit board on which an ASIC may be mounted or onto a back plane to which such a printed circuit board may be connected.

The AHB 12 includes three masters, including masters 22, typically microprocessor cores in the ASIC, and master bridge 14. A master is a device that can initiate read and write bus operations. In this example, the AHB 12 is supporting the DSP slave bridge 20, and a second slave 24 which is part of the ASIC. Slaves are devices which respond to, but do not initiate, read and write operations. The AHB 12 comprises two distinct busses, a master bus 26 and a slave bus 28. An AHB arbiter 30 determines the next master to access the bus and ensures that only one bus master at a time is allowed to initiate data transfers. Each AHB includes only one arbiter. The arbitration protocol is fixed, but the algorithm for arbitration is open and up to the designer to implement (round robin, highest priority, fair access, etc.) depending on the application requirements. The arbiter 30 controls a multiplexor 32 which couples the selected master to the master bus 26. The AHB 12 has a decoder 34 which receives address signals on master bus 26 and determines which slave the master has addressed. Decoder 34 controls a slave multiplexor 36 which connects the selected slave to the slave bus 28.

Operationally, the AHB 12 works as follows. The arbitration unit 30 grants bus ownership to a master based on some arbitration protocol. Once a master has obtained a grant, that master's interface signals are multiplexed onto the master bus 26. This master bus is shared by all of the slaves. The slaves are responsible for returning data and control status signals that designate completion or current status of the data operation. These slave signals are multiplexed back to the slave bus 28 that is, in turn, fed to all of the masters. The bus arbitration unit 30 controls the multiplexor 32 that selects the master that passes information to the slaves. Part of this arbitration information is passed to a slave bus decode unit 34 that controls multiplexor 36 that selects which of the slaves can transfer data to the masters.

With reference to FIG. 2, there is provided a block diagram of the DSP 10 coupled to the on-chip bus 12 as a slave only. The slave bridge 20, also designated ApZslv, contains four modules. A generic slave module 38 (Hslave), translates the AHB 12 protocol into a more generic bus protocol, also referred to herein as the bridge bus protocol on the bridge bus 39. A slave engine 40 (ApZslvEngine), manages access requests from the AHB 12 to the internal memories of the DSP 10. A grower module 42 (ApZslvGrower), and a shaver module 44 (ApZslvShaver), lengthen and shorten the bridge bus 39 signals so that the generic slave module 38 and the slave engine 40 can operate at different clock speeds. All modules used in the slave bridge have been given names with the prefix "ApZslv".

The DSP 10 internal memories 16, 18 have an internal DMA (direct memory access) Interface module 46. The slave engine 40 is connected to the DSP 10 through the DMA Interface module 46. The internal memories 16, 18 are structured in such a way that multiple masters can access the entire memory at the same time. The internal memories are broken into banks. Separate banks may be accessed at the same time by different masters. The DSP retains the right to access the internal memories without wait states. Thus, the DSP 10 has priority and the interface to the on-chip bus 12 may have to stall if it's access conflicts with an active DSP access.

With reference to FIG. 3, more details of the slave engine 40 are illustrated. The engine 40 contains a request queue 48. Both read and write requests can exist in the queue 48. The request queue 48 lets write requests from the bridge bus 39 complete faster by posting them in the queue while previous write requests are being performed in the internal memories. This lets the bus 12 transfer more pieces of data instead of wasting time waiting for a write request to complete. Ordering of write requests and read requests is strictly enforced. In other words, all enqueued transactions complete in order. The request queue is the subject of U.S. patent application Ser. No. 09/847,850 entitled "A Parameterizable Queued Memory Access System" by inventor Charles H. Stewart, filed on the same date as this application and assigned to the assignee of the present application, which application is hereby incorporated by reference for all purposes.

The slave engine 40 also contains read buffers 50. The read buffers 50 are used to hold data read from the internal memories 16, 18 in response to read requests until the data can be accepted by the master which issued the read request. The internal memory path is 64 bits wide on read transactions.

The slave engine 40 also contains a state machine 51. The state machine controls overall function of the slave bridge 40, including request queue 48 and buffers 50, and is described in more detail below. However, the state machine is separate from the request queue. This lets the queue block manage itself while the state machine deals with the specific protocol of the bridge bus 39.

With reference to FIG. 4, a more detailed illustration of the FIG. 2 system is provided. FIG. 4 includes more details of the request queue 48 and read buffer 50 shown in FIG. 3. Corresponding parts shown in the various figures are identified with the same reference numbers.

In the following descriptions of the functions of the slave bridge 20 (FIGS. 2 and 4), a number of defined signals pass between the bridge 20 and the on-chip bus 12 on one side and the DSP 10 on the other side. In addition, certain defined signals pass between the generic slave 38 and the slave engine 40 and form the bridge bus 39. These signals are defined by name, direction and function in tables 1, 2 and 3 below.

Table 1, provides a list of the signals which pass between the slave bridge 20 and the on-chip bus 12 on one side and the DSP 10 DMA Interface 46 on the other side. This table may also be described as a pin list, since it defines the functions of package pins if the slave bridge 20 is implemented as a separate device on its own chip. Since the on-chip bus used in the preferred embodiment is the AMBA AHB, the bus signal names all begin with a capital "H" in conformity with the AMBA specification as published by ARM Limited, which specification is hereby incorporated by reference in its entirety and for all purposes. The HCLKEN is also named this way since it is derived from the same clock source as the HCLK signal as explained in more detail below.

TABLE 1

| Signal | Dir | Description |
| --- | --- | --- |
| HCLK | input | This clock times all bus transfers |
| HCLKEN | input | This signal is used in clock boundary synchronization |
| HRESETn | input | This active low signal is used to reset the system and the bus. |
| HADDR[17:0] | input | The master to slave address bus. This bus is byte addressable. |
| HTRANS[1:0] | input | Indicates the type of the current transfer |
| HWRITE | input | When high this signal indicates a write transfer |
| HSIZE[2:0] | input | Indicates the size of the transfer |
| HBURST[2:0] | input | Indicates if the transfer forms part of a burst |
| HWDATA[31:0] | input | The master to slave data path. This bus is little endian. |
| HSEL | input | The internal slave select |
| HREADY | input | The HREADY from the last selected slave |
| HRDATAOUT[31:0] | output | The slave to master data path |
| HREADYOUT | output | When high, this signal indicates that a transfer has finished on the bus |

TABLE 1-continued

| Signal | Dir | Description |
| --- | --- | --- |
| HRESPOUT[1:0] | output | Additional information about the status of the transfer |
| SlvClk | input | The "fast" system clock |
| Dma_mem_addr[16:2] | output | The requested memory address. The internal memories are 64 bit addressable. |
| Dma_mem_data[63:0] | output | Engine to Memory data |
| Dma_mem_rd | output | A read is requested |
| Dma_mem_wr[3:0] | output | Write enables for the internal memory |
| Mem_dma_data[63:0] | input | Memory to Engine data |
| Mem_dma_done | input | Request is done |

Table 2 provides a list of the signals which pass between the generic slave 38 and the AHB 12 on one side and the slave engine 40 on the other side. These signals include a portion of the signals in Table 1, because the generic slave unit 38 is directly connected to the bridge 20 pins on the on-chip bus 12 side. Signals passing from the generic slave 38 to the slave engine 40 will, of course, pass through the grower 42 or the shaver 44 and form part of the bridge bus 39.

TABLE 2

| Signal | Dir | Description |
| --- | --- | --- |
| HCLK | input | This clock times all bus transfers |
| HRESETn | input | This active low signal is used to reset the system and the bus. |
| HADDR[17:0] | input | The master to slave address bus. This bus is byte addressable. |
| HTRANS[1:0] | input | Indicates the type of the current transfer |
| HWRITE | input | When high this signal indicates a write transfer |
| HSIZE[2:0] | input | Indicates the size of the transfer |
| HBURST[2:0] | input | Indicates if the transfer forms part of a burst |
| HWDATA[31:0] | input | The master to slave data path. This bus is little endian. |
| HSEL | input | The internal slave select |
| HREADY | input | The HREADY from the last selected slave |
| HRDATAOUT[31:0] | output | The slave to master data path |
| HREADYOUT | output | When high, this signal indicates that a transfer has finished on the bus |
| HRESPOUT[1:0] | output | Additional information about the status of the transfer |
| EightBitWrite | output | An Eight bit write was detected (HSIZE == 0 and HWRITE). Signal is invalid unless SlvEn is high. |
| SlvClk | output | The internal slave clock |
| SlvEn | output | The bridge bus enable lines |
| SlvNewXfer | output | Asserted co-incident with the first SlvEn for a given single or burst transfer. |
| SlvWr | output | The bridge bus write enable. SlvWr is invalid unless used with SlvEn. |
| SlvWrEn[3:0] | output | The bridge bus write enable. Each bit corresponds to a byte lane. |
| SlvAddr[15:0] | output | The bridge bus address. This address is 32 bit addressable. |
| SlvNexAddr[15:0] | output | The predicted next address when bursting. This address is 32 bit addressable. |
| SlvWrData[31:0] | output | The bus to slave data path |
| SlvBurst[2:0] | output | The bus to slave burst indicator. The format of the burst indication mirrors the HBURST signal. |
| SlvRdData[31:0] | input | The slave to bus data path |
| SlvReady | input | The slave accepts the transfer |
| SlvError | input | The current transaction resulted in an error. |

Table 3 provides a list of the signals which pass between the slave engine 40 and the generic slave 38 on one side and DSP 10 DMA Interface 46 on the other side. These signals include a portion of the signals in Tables 1 and 2, because the slave engine 40 is connected to the generic slave 38 on one side and is directly connected to the bridge 20 pins on the DSP 10 side.

TABLE 3

| Signal | Dir | Description |
| --- | --- | --- |
| dma_mem_addr[16:2] | output | The requested memory address. The internal memories are 64 bit addressable. |
| dma_mem_data[63:0] | output | Engine to Memory data |
| dma_mem_rd | output | A read is requested |
| dma_mem_wr[3:0] | output | Write enables for the internal memory |
| EightBitWrite | output | An Eight bit write was detected (HSIZE = = 0 and HWRITE). Signal is invalid unless SlvEn is high. |
| Flush | input | Used to flush any pending transfers |
| FlushAck | output | Acknowledges the Flush request |
| mem_dma_data[63:0] | input | Memory to Engine data |
| mem_dma_done | input | Request is done |
| QueSpecEn | input | When high, lets the engine prefetch. |
| QueSpecDepth[3:0] | input | The prefetch count. |
| SlvAddr[15:0] | input | The bridge bus address. This bus is 32 bit addressable. |
| SlvNextAddr[15:0] | input | The predicted next address when bursting. This address is 32 bit addressable. |
| SlvClk | input | The clock |
| SlvEn | input | The slave enable |
| SlvNewXfer | input | Asserted co-incident with the first SlvEn for a given single or burst transfer. |
| SlvBurst[2:0] | input | The slave burst indicator. The format of the burst indication mirrors the HBURST signal. |
| SlvError | output | The current transaction resulted in an error. The transaction data is not guaranteed. This signal is coincident with SlvReady. |
| SlvRdData[31:0] | output | The slave to bus data path |
| SlvReady | output | The slave accepts the transfer |
| SlvWrData[31:0] | input | The bus to slave data path |
| SlvWrEn | input | The bridge bus write enable. When low, a read transfer is commanded. |
| SlvWr | output | The bridge bus write enable. SlvWr is invalid unless used with SlvEn. |
| Stop | input | Used to flush and halt the interface engine |
| StopAck | output | Acknowledges the Stop request |

The slave engine 40, FIG. 3, uses several internal signals not included in Tables 1, 2 and 3. The ReadHit signal is generated by the read buffer 50 and used by the state machine 51. It indicates that read data requested by the state machine 51 is present in the read buffer. The QueFull signal is generated by the request queue 48 and used by the state machine 51. It indicates that the request queue is full and cannot accept more requests. The QueBufAddr and QueBufValid signals are generated by the request queue 48 and used by the read buffer 50. They are used by the request queue 48 to communicate to the read buffer 50 a request's address when it is finishing at the internal memories. QueBufValid is only valid when data is returning from internal memory. The ReadExistsInQueue signal is generated by the request queue 48 and used by the state machine 51. It indicates that there is a valid read in the request queue 48.

As an example of the operation of the slave engine 40 (as shown in FIGS. 1, 2 and 3), consider a four beat incrementing read burst on the AHB bus 12. The generic slave module 38 uses the SlvBurst signal to signal the slave engine 40 that a burst access from AHB 12 is occurring, and also drives the current address (SlvAddr) and the next address (SlvNextAddr) to the slave engine 40. As the first read transaction occurs, the state machine 51 signals the acceptance of the current read address and signals the request queue 48 to accept a new entry (assuming that the queue is not full). The state machine 51 asserts the read address to the read buffer 50 and the read buffer returns the ReadHit indication, see FIG. 3. If speculation is enabled (QueSpecEn), the state machine 51 may enqueue several follow-on addresses, speculating that those addresses may be accessed shortly. When the first read transaction finishes at the internal memory 16, 18, the read buffer 50 accepts the data and presents the ReadHit flag. The state machine 51 places the data on the bus, and checks the next bus address in the burst against the read buffer 50 (if the master is ready for it). If the next datum is already contained in the read buffer, it is returned with no wait states. Otherwise the process restarts with the state machine 51 enqueueing the read miss address.

The generic slave 38 (see FIGS. 1, 2 and 3) follows the on chip bus 12 protocol for the signals which interface with the on-chip bus 12, in this case the AMBA AHB protocol. Its connections to the slave engine 20 through the pulse grower 42 and pulse shaver 44 comprise a bridge bus 39 having a slightly different protocol than the on-chip bus 12. The bridge bus 39 is a pipelined bus, where the data follows a clock cycle after the address appears on the bridge bus. A slave must only respond to an access when it samples both its SlvEn and SlvReady high. The address and control signals are driven with respect to the clock. One, and only one, SlvEn line is driven. If the access is a write, the appropriate SlvWrEn lines will be driven. If none of the write lines are active, the access is a read.

The write enable signals follow the format set by the AHB bus 12. For instance, it is impossible to have only SlvWrEn [3] and SlvWrEn[0] active at the same time; the bridge bus 39 is little endian; and, SlvWrEn[0] corresponds to the least significant byte.

The slave must drive its SlvReady signal when it is ready to accept the current transaction. The slave may also drive SlvError when an eight-bit write is detected. The SlvError signaling protocol mirrors the protocol used on the AHB bus 12 when the slave response is ERROR. SlvError is driven high while SlvReady is driven low for a clock cycle. SlvError and SlvReady are then both driven high for a clock cycle. Data written in a transaction that results in SlvError is discarded.

FIG. 5 illustrates the general character of the bridge bus protocol. FIG. 5 shows a basic zero wait state write transaction A, followed by a write transaction B with one data wait state, and a write transaction C with one address wait state. Transaction B has an error response. Note that FIG. 5 can be used for read transactions or read and write transactions mixed together. The only difference is that read data comes out on the SlvRdData bus.

The internal memory interface protocol between bridge 20 and the DMA Interface 46, see FIG. 2, is simple. The address and control signals (dma_mem_addr[16:2], dma_mem_data[63:0], dma_mem_rd, and dma_mem_wr[3:0] (Table 1)) are presented to the memories 16, 18. The memory returns the mem_dma_done signal and, if the request is a read, mem_dma_data[63:0] when the request has finished. Another valid access request can be asserted co-incident with mem_dma_done. The master of the transaction must continue to keep the control signals asserted valid until mem_dma_done is active. The mem_dma_done signal is driven from a flip flop, so it is possible to change the control signals asynchronously. This is the only way to pipeline access requests into the internal memory interface unit. If a request is finishing, mem_dma_done is asserted, and another request is not ready, the control signals must be turned off immediately (asynchronously).

FIG. 6 illustrates the general function of the internal memory interface protocol. In FIG. 6, two write transactions A and C and a read transaction B can be seen. The first write occurs between idle cycles. After the internal memory asserts mem_dma_done, the interface signals go to their inactive state. A burst transaction begins with cycle B. Cycle B is a read transaction. This transaction finishes with no wait states. Cycle C is asserted asynchronously after mem_dma_done is asserted for cycle B. Cycle C contains one wait state.

There are two sets of special signals in Table 3 used in the internal memory interface. The flush (Flush) and flush acknowledge (FlushAck) signals are used to force the queue 48 to complete all of its pending transfers before accepting any new transfers. The stop (Stop) and stop acknowledge (StopAck) signals are used to force the engine 40 to complete all pending transfers and stop accepting new traffic. Stop is generally asserted before turning the clocks to the engine 40 off.

The Flush signal is used to force the request queue 48 to complete all of its outstanding entries. When the request queue 48 is empty, and Flush is asserted, the request queue will drive FlushAck true. FlushAck is driven from a flip flop.

In order to prevent deadlocks, the queue 48 is not forced to stay empty. Instead, Flush forces the queue 48 to only accept one queue entry at a time. Once the queue 48 accepts an entry, however, the queue must finish that entry and then assert FlushAck before it can accept a new entry. This behavior means that a master who keeps Flush asserted may see the FlushAck signal rise and fall after the first FlushAck assertion.

The Stop signal is used to force the state machine 51 to stay in IDLE once the state machine 51 transitions to IDLE. When this occurs, the state machine will drive the StopAck signal. Stop is generally used by the power management logic to force the state machine 51 into a known state before turning off clocks.

The Stop driver must take care when asserting Stop. If the state machine 51 is driving StopAck, the slave bridge 20 HREADY line will also be driven low. This is done because the engine is not capable of transitioning to any state other than IDLE. So, if a master is granted bus access and generates an address that hits the slave bridge 20 while Stop is asserted, the system will hang indefinitely. FIG. 7 is a flow chart which illustrates the functions of the state machine 51 which controls the Engine 40. The loading of the request queue 48, the slave bus responses, and the invalidation (i.e. clearing out) of the read buffer 50 are controlled through the state machine 51.

The state machine 51 takes several inputs. The slave bus 26 is the primary input bus. New read and write requests are input on this bus. The request queue 48 returns QueFull, QueAlmostFull, and ReadExistsInQueue indications to the state machine 51. The read buffer 50 returns a ReadHit indicator and read data to the state machine 51.

The state machine is responsible for enqueueing new transactions into the request queue 48 and clearing the read buffer 50. Signals which travel out of the slave engine 40 are driven by flip flops to simplify the timing analysis. The Flush and FlushAck signals are not used directly by the state machine. Instead, the read and write buffers gate QueFull until FlushAck is active.

The state machine 51 drives the SlvError signal when an eight bit write is detected. A transition through the ERROR state is also forced so that the ERROR protocol is maintained.

The state machine 51 will invalidate (clear out) the read buffer 50 if the WRITESTALL, WRITE, or ERROR states are reached. This is done to make sure that coherency is maintained without having to implement write and read queue hit logic. The state machine 51 will also invalidate the read buffer 50 when a SlvNewXfer, Tables 2 and 3, (HTRANS==NonSeq) is detected. This helps maintain coherency by ensuring that an external polling loop can read the correct data. A read miss transition from QUERY to READ will also cause the read buffer 50 to be invalidated.

The speculate enable (QueSpecEn) and speculation depth (QueSpecDepth), Table 3, are used by the state machine 51 to prefetch linear burst data. When QueSpecEn is high, the state machine 51 will attempt to prefetch QueSpecDepth 64 bit values after the first address in a burst. QueSpecDepth can take values from 0 to 16. Care must be taken when setting the speculation depth to a large number. A large number may cause unnecessary speculative reads. The depth of the queue 48 also limits the number of possible speculative reads to the depth of the queue minus one. Every prefetch action takes place after an initial read, which takes up one queue slot, which leaves depth minus one for the prefetches.

In the IDLE state, the state machine 51 evaluates input conditions from the slave. If no activity is implied by the slave bus, then SlvReady, Tables 2 and 3, will be driven high on the next clock. SlvReady is always high in the IDLE state. If a read occurs, the state machine 51 will transition to QUERY to find out if the read exists in the read buffer 50. If a write occurs, and the queue 48 is full or there is a read in the queue, the state machine 51 will transition to WRITESTALL. If a write occurs, and the queue 48 is not full, the state machine 51 will transition to WRITE in preparation for a write burst. If an eight bit write occurs, the state machine will transition to ERROR.

In the QUERY State, the state machine 51 determines if the current read request is contained in the read buffer 50 or not (ReadHit). If there is a read hit and the transfer is not a burst transfer, then the next state is IDLE and the next SlvReady will be asserted (the data is presented to the bridge bus 39). If there is a read hit and the transfer is a burst transfer, then the next state will be BURST, and the next SlvReady will be asserted. If there is no read hit and the queue 48 is not full, the state machine 51 will shift the current read transaction into the request queue 48 and transition to READ. If speculation is enabled, the QUERY state loads the speculation address counter. If there is a read miss and the Queue 48 is full, the state machine remains in QUERY. SlvReady is always low while in the QUERY state.

The state machine 51 will be in the READ state when the engine 40 is fetching data from the internal memories 16, 18. The state machine 51 will transition from READ to IDLE when there is a ReadHit and the transfer is not a burst. If there is a read hit and it is a burst transfer, the state machine 51 will transition to BURST. While it is waiting in READ, the state machine 51 will enter speculative reads into the queue if SlvBurst and QueSpecEn are active. If enabled, it will enter speculative reads until the count reaches QueSpecDepth or the queue 48 becomes full. SlvReady is always low while in the READ state.

The state machine 51 will be in the BURST state when a read burst is occurring. When transitioning to the BURST state, the SlvNextAddr is latched for use in the BURST state. This address corresponds to the address being driven from the master to the slave because this is a burst transfer. This address is driven to the read buffer 50 to find out whether that address is a read hit. If there is a read hit, then the state machine 51 stays in BURST and drives out the correct data on the next clock cycle if the master is ready for it. If there is a read miss, the state machine 51 transitions to QUERY. If a new transfer (SlvNewXfer) is starting, the state machine 51 will invalidate the read buffer 50 and transition to QUERY if the new cycle is a read or WRITE/WRITESTALL/ERROR if the new transaction is a write. These transitions are the same as the IDLE transitions. SlvReady is always high during the BURST state.

The state machine 51 will be in the WRITE state when the slave bus is in a write data phase. The address of the write transaction was saved on the last clock, and it is used with the current data as input to the request queue 48. SlvReady is always high during this state. If another write is detected, and the write is an eight bit write, the state machine 51 will transition to ERROR. If the queue 48 is full, the state machine 51 will transition to WRITESTALL and SlvReady will be deasserted next clock. If a read occurs, the next state will be the QUERY state. The state machine 51 will transition to IDLE if there is no valid slave bus request. The "Load" signal from the state machine 51 to the request queue 48 is always high in the WRITE state. The Invalidate signal to the read buffer 50 is always asserted in the WRITE state.

If the queue 48 is full and a write request is pending, the state machine 51 transitions to the WRITESTALL state. The state machine 51 will wait in this state until the condition clears, and then it will transition to the WRITE state. The state machine 51 will also transition to WRITESTALL when a read request exists in the queue 48. The state machine 51 will wait until the read request flushes out of the queue 48 before the write request is allowed to enter the queue 48. This is done so that the logic used to maintain coherency remains small. SlvReady is always deasserted when in the WRITESTALL state. The Invalidate signal to the read buffer 50 is always asserted in the WRITESTALL stage.

The state machine 51 always transfers to IDLE from ERROR when an eight bit write transaction is detected. When the state machine is in the ERROR state, SlvReady is de-asserted and SlvError is asserted. The next SlvReady will be asserted, and the next state of SlvError will be asserted. The ERROR state is used to create the two clock cycle error response needed by the AHB bus 12.

With reference to FIGS. 3 and 4, the request queue 48 drives QueFull and QueAlmostFull to the state machine 51. The state machine enters new requests into the queue 48. The request queue 48 then uses the interface to internal memory to fulfill the requests. Internal logic will drive FlushAck when the queue 48 is empty and Flush is asserted.

Since the address and control signals driven to the internal memories are supposed to change asynchronously with respect to the mem_dma_done signal, there must be a queue of control signals heading to internal memory. The primary and secondary queue positions hold the "current" and the "next" access respectively. The mem_dma_done signal controls the multiplexer that selects the current access. mem_dma_done also makes the queue 48 shift. The primary queue position is filled first. mem_dma_done is driven from a flip flop and is coincident with the read return data. The control logic for the first two parts of the access request queue 48 is shown in FIG. 8. The length of the request queue 48 is parameterizable, but is set in this design to 6. The queue 48 can be from two items to 16 items long.

The queue 48 can hold both read requests and write requests at the same time. However, the state machine must not allow certain read/write orders because they may cause non-coherent operation. A write request is not allowed into the queue 48 when a read request is already in the queue 48. The read buffer 50 is flushed when write requests enter the queue 48. In the case described above, the earlier read request might fill the buffer after it had been cleared. The read address may be from the same address as the write request. In this case, the read data and the read buffer 50 would be non-coherent (old) because the read data might be different from the write data in the queue 48.

The read buffer 50, FIGS. 3 and 4, consists of four 64 bit data buffers. These buffers are queried any time a read request arrives on the slave bus for the internal memories 16,18. The read buffer 50 is invalidated (cleared) by the state machine 51 under several circumstances. The state machine 51 will invalidate (clear out) the read buffer 50 if the WRITESTALL, WRITE, or ERROR states are reached. This is done to make sure that coherency is maintained without having to implement write and read queue hit logic. The state machine 51 will also invalidate the read buffer 50 when a SlvNewXfer (HTRANS==NonSeq) is detected. This helps maintain coherency by ensuring that an external polling loop can read the correct data. A read miss transition from QUERY to READ will also cause the read buffer 50 to be invalidated.

FIG. 8 illustrates a "least recently used" buffer fill scheme, the LRU algorithm, which the read buffer 50 uses anytime a read completes in the request queue 48. The LRU algorithm is based on a tree structure and results in an overhead of only three flip flops. Bits A, B, and C control the selection of the buffer to be replaced. If a bit is a one, the tree is traversed to the right. For instance, suppose that {A,B,C}= 000. Since B is zero, the tree is traversed to the left, to A. Since A is zero, the tree is traversed to the left again, selecting buffer zero as the LRU buffer.

When a buffer is hit, the bits on the branches pointing to it are inverted. In the case above, the next state of the LRU after 000 would be 110. When 110 is followed down the tree, the LRU buffer is buffer 2. If a read is returning data, and there is a hit on one of the leaf nodes, the hit leaf node is skipped over in the replacement rotation.

The engine 40 is responsible for maintaining the coherency of its transactions. To meet this aim, several rules are built into the operation of the engine 40. Transactions are strictly ordered in the queue 48. This means that read requests cannot pass write requests. This avoids costly write hit logic.

The engine 40 is allowed to prefetch, but these speculative reads must flush out of the request queue 48 before a write is allowed to enter the queue 48. Otherwise, the read buffer 50 invalidate logic would become more complicated. This rule makes the read buffer 50 flushing logic simpler, i.e. incoming write requests flush the read buffer.

There is one coherency problem that can occur when the slave bridge 20 is used with a master bridge 14 (see FIG. 1). In typical software message passing routines, a master 22 may wish to communicate with the DSP 10. To do this, the master 22 writes a message to the DSP's memories 16, 18, and sets a bus based flag. The DSP 10 uses its master bridge 14 to read the bus-based flag before reading the message out of its internal memories 16, 18. The coherency problem occurs if the DSP 10 reads the external Flag, finds it set, and then reads its internal memories 16, 18. Part of the message, supposed to be stored in the internal memories, may still be waiting in the queue 48. The result is that the DSP 10 may receive only a partial message even though the flag is set. To fix this coherency problem when a master bridge 14 is used to read the bus, the slave's queue 48 must be emptied before the bridge master read request is allowed on the bus. To clear out the queue 48, the master bridge 14 must use the Flush/FlushAck protocol.

The DSP 10 and its memories 16,18 may run at a different speed than the AHB 12. Because of routing concerns, the bus may need to run at a slower frequency than the core. In order to support this mode, the slave bridge 20 supports a clock domain interface. The DSP 10 and therefore engine 48 may run from 1 to 8 times faster than the bus 12.

As shown in FIGS. 3 and 4, a pair of clock synchronizers, a pulse grower 42 (ApZslvPulseGrower) and a pulse shaver 44 (ApZslvPulseShaver), sit between the generic slave 38 and the engine 40. This position lets the synchronizers become simple because they only have to translate the bridge bus 39 signals. The length of signals going to the engine 40 from the generic slave 38 are made shorter in the shaver module 44. The length of signals going from the engine 40 to the generic slave 38 are made longer in the grower module 42.

The grower module 42 and shaver module 44 depend upon a signal called HCLKEN generated from a central clock management resource. There are also two clocks defined. The fast clock in this design is called SlvClk, and the slow clock is called HCLK. The two clocks are related by a simple divisor from one to eight, and are positive edge aligned. HCLKEN is always the length of one "fast" clock pulse, and is always coincident with the fast clock pulse that proceeds the positive edge of the slow clock. HCLKEN is always high in divide by one mode, that is when the clocks operate at the same speed.

FIG. 9 shows a simple incrementing burst read from the AHB bus 12. In this case, the AHB bus 12 and the DSP memories 16, 18 are running at the same clock frequency. In this example, the DMA interface 46 returns data at the fastest rate.

The bridge 20 may be implemented on a separate chip. The bridge 20, the DSP 10 and an ASIC may then be interconnected by mounting on a single printed circuit board or on multiple boards connected to a backplane. This would offer maximum flexibility in terms of matching DSPs to ASICs for a particular application.

Alternatively the bridge 20 may be implemented on a chip containing the DSP 10. Since the bridge of the preferred embodiment provides its outputs in the AMBA AHB protocol and that protocol is becoming a standard for ASICs, it makes the DSP compatible with many available ASICs. In this case the DSP plus bridge chip can be connected to an ASIC by a printed circuit board or across a backplane.

Alternatively the bridge 20 may be implemented on a chip with an ASIC or on a chip with the DSP 10 and an ASIC. A fully integrated bridge plus DSP plus ASIC should provide cost and size advantages for large volume applications such as cellular telephones with Internet functions.

While the present invention has been illustrated and described in terms of particular apparatus and methods of use, it is apparent that equivalent parts may be substituted of those shown and other changes can be made within the scope of the present invention as defined by the appended claims.

What I claim as my invention is:

1. Apparatus for connecting a digital signal processor to an application specific integrated circuit (ASIC) on-chip bus as a slave comprising:
   a bridge for coupling signals between internal memory of a digital signal processor and an ASIC on-chip bus, said bridge comprising:
     a generic bus slave coupled to said ASIC on-chip bus, said generic bus slave translating on-chip bus protocol signals into bridge bus protocol signals;
     a slave engine coupled to said digital signal processor, said slave engine having control logic for providing signals which control the flow of instructions and data to and from said internal memory of said digital signal processor;
     a grower module coupled between said slave engine and said generic bus slave, said grower module lengthening bridge bus protocol signals being transmitted from said slave engine to said generic bus slave; and
     a shaver module coupled between said slave engine and said generic bus slave, said shaver module shortening bridge bus protocol signals being transmitted from said generic bus slave to said slave engine;
   wherein said digital signal processor and said slave engine operate at a first clock frequency; and
   wherein said on-chip bus and said generic bus slave operate at a second clock frequency different than said first clock frequency.

2. The apparatus of claim 1 wherein the digital signal processor comprises a direct memory access unit coupled to said internal memory and having external memory ports providing access to said internal memory, said direct memory access unit coupling said digital signal processor to said slave engine.

3. The apparatus of claim 2 wherein said bridge has bus bridge ports adapted for receiving and responding to read and write requests from said on-chip bus.

4. The apparatus of claim 3 wherein said generic bus slave provides signals at said bus bridge ports in compliance with the on-chip bus protocol.

5. The apparatus of claim 2 wherein said bridge has memory bridge ports adapted for providing read and write requests to said external memory ports.

6. The apparatus of claim 5 wherein said slave engine provides said signals at said memory bridge ports.

7. The apparatus of claim 6 wherein said bridge has bus bridge ports adapted for receiving and responding to read and write requests from said on-chip bus.

8. The apparatus of claim 7 wherein said generic bus slave provides signals at said bus bridge ports in compliance with the on-chip bus protocol.

9. The apparatus of claim 8 wherein said on chip bus operates under advanced microcontroller bus architecture.

10. The apparatus of claim 9 wherein said on chip bus operates under advanced high-speed bus protocol.

11. The apparatus of claim 6 wherein said slave engine comprises a request queue which stores read and write requests from said on-chip bus.

12. The apparatus of claim 6 wherein said slave engine comprises a read buffer which stores data provided by said internal memory in response to read requests from said on-chip bus.

13. A method for executing read and write requests initiated on an application specific integrated circuit (ASIC) on-chip bus in internal memory of a digital signal processor coupled to said ASIC on-chip bus by a bridge, comprising:
   converting read and write requests from an on-chip bus protocol to a bridge bus protocol;

coupling said converted bus bridge protocol signals to said internal memory of said digital signal processor;

reducing the length of said converted bus bridge protocol signals while coupling said converted bus bridge protocol signals to said internal memory of said digital signal processor;

coupling bus bridge protocol signals from said internal memory of said digital signal processor to said ASIC on-chip bus; and while coupling said bus bridge protocol signals from said internal memory of said digital signal processor to said ASIC on-chip bus, increasing the length of said bus bridge protocol signals from said internal memory of said digital signal processor and converting said increased length bus bridge protocol signals from said bus bridge protocol to the on-chip bus protocol;

wherein said on-chip bus and a first portion of said bridge which converts signals between the on-chip bus Protocol and the bus bridge protocol bus operate at a first clock frequency and wherein said digital signal processor and a second portion of said bridge which couples said digital signal processor to said first portion of said bridge operate at a second clock frequency different than said first clock frequency.

14. The method of claim 13 further comprising:

temporarily storing said requests in a request queue until said internal memory is able to execute the requests.

15. The method of claim 14 wherein said on-chip bus read request is a burst request, further comprising:

storing a plurality of prefetch read requests in said request queue.

16. The method of claim 13 further comprising:

temporarily storing data provided by said internal memory in response to a read request in a buffer until said data can be accepted by said on-chip bus.

17. The method of claim 16 wherein said on-chip bus read request is a burst request, further comprising:

storing a plurality of prefetched data in said buffer.

18. The method of claim 13 wherein said on-chip bus operates under advanced microcontroller bus architecture.

19. The method of claim 18 wherein said on-chip bus operates under advanced high-performance bus protocol.

20. Apparatus for executing read and write requests initiated on an application specific integrated circuit (ASIC) on-chip bus in internal memory of a digital signal processor comprising:

bridge means for coupling signals between internal memory of a digital signal processor and an ASIC on-chip bus, said bridge means comprising:

generic slave means for converting read and write requests from an on-chip bus protocol to a bridge bus protocol;

engine means for converting said read and write requests in said bridge bus protocol to control signals causing read and write transactions with said internal memory of said digital signal processor;

wherein said digital signal processor and said engine means operate at a first clock frequency and said ASIC on-chip bus and said generic slave means operate at a second clock frequency different than said first clock frequency.

21. The apparatus of claim 20 further comprising means for adjusting the length of signals on said bridge means to compensate for said differing clock frequencies.

22. The apparatus of claim 20 wherein said engine means further comprises queue means for storing read and write transaction requests until such requests can be completed in the memory.

23. The apparatus of claim 22 wherein said engine means further comprises means for, in response to a burst read request, storing a plurality of read requests in said queue.

24. The apparatus of claim 20 wherein said engine means further comprises read buffer means for storing data provided by said internal memory until said on-chip bus can read said data.

25. The apparatus of claim 24 wherein said engine means further comprises means for, in response to a burst read request, storing a plurality of prefetched data in said buffer.

26. The apparatus of claim 24 wherein said on-chip bus operates under advanced high-speed bus protocol.

27. The apparatus of claim 20 wherein said on-chip bus operates under advanced microcontroller bus architecture.

* * * * *